3,190,866
OLEFIN POLYMERIZATION PROCESS
Roger M. Nagel, Pennington, and Maigonis Gabliks, New Brunswick, N.J., assignors to Petro-Tex Chemical Corporation, Houston, Tex., a corporation of Delaware
No Drawing. Filed Apr. 10, 1961, Ser. No. 101,668
5 Claims. (Cl. 260—93.7)

This invention relates to the polymerization of butene-1 and relates more particularly to an improved method for polymerizing butene-1 with a titanium halide, a trialkyl aluminum compound and a tin halide.

The polymerization of olefins with catalyst compositions of transition metal compounds such as the titanium halides and alkyl aluminum compounds is well known. For example, ethylene has been polymerized to high molecular weight solid polymer with triethyl aluminum and titanium tetrachloride. However, such catalyst systems have not been satisfactorily employed to provide commercial polybutene. It has now been found that butene-1 can be polymerized to high molecular weight isotactic polymers in the presence of a novel catalyst comprising titanium tetrachloride, a trialkyl aluminum compound and a stannous halide, at a much faster rate than when such polymerizations are conducted in the absence of the added stannous halide and isotactic polymers with improved physical properties are thereby obtained.

The trialkyl aluminum component of the catalyst system may be any trialkyl aluminum compound of the formula $R_3Al$, wherein R is a saturated acyclic hydrocarbon radical containing 2 to 10 carbon atoms and including, for example, triethyl aluminum, tripropyl aluminum, tributyl aluminum, triamyl aluminum, trihexyl aluminum, trioctyl aluminum and the like. Excellent results are obtained with trialkyl aluminum compounds wherein the alkyl groups contain 2 to 4 carbon atoms.

The inorganic metal halide component of the catalyst may be, for example, stannous chloride, fluoride, iodide or bromide. It was found, quite unexpectedly, that the stannous halides were unique in effect in the catalyst system of this invention. When stannic chloride was used in place of stannous chloride, low yields of polymer of poorer physical properties are obtained as compared to stannous chloride.

In the catalyst complex, the ratio of constituents may be varied within the following ranges. Based on one mol of titanium halide, the trialkyl aluminum compound may be varied from about 0.5 mol to 5 or even 10 mols. However, it is an unexpected advantage of this invention that the ratio of trialkyl aluminum compound to titanium tetrachloride may be quite low. For example, when butene-1 is polymerized with triethyl aluminum and titanium tetrachloride in a molar ratio of about one mol of triethyl aluminum to about one mol of titanium tetrachloride, the polymerization rate is slow, the ultimate polymer yield is low and the physical properties of the resulting polybutene polymers are poor. When, however, in accordance with this invention, the catalyst also includes about one-third mol of a stannous halide per mol of trialkyl aluminum, as stannous chloride, increased yield of polybutene having improved physical properties is obtained, and such yield increase and improved polymer obtained with such catalyst system are better than that obtained when polybutene is prepared from a catalyst containing 3 mols of trialkyl aluminum to one mol of titanium tetrachloride. Preferably, the molar ratio of trialkyl aluminum to titanium tetrachloride is from 1 to 1 to about 4 to 1. The amount of stannous halide employed in the catalyst complex may be varied, and while very small amounts of stannous halide will give some improvement, normally an amount from about 0.1 to about 0.5 to one mol of stannous halide per mol of titanium tetrachloride will be employed. Stannous chloride and fluoride are preferred materials.

In using the catalyst a number of procedures may be employed. For example, the trialkyl aluminum compound in an inert solvent may be added to the titanium tetrachloride and the stannous halide in an inert solvent added thereto, or the titanium tetrachloride and stannous halide may be mixed together and the trialkyl aluminum compound added thereto, normally in an inert organic solvent. Hydrocarbons are normally employed as the inert organic solvent. While the catalyst complex may be prepared at temperatures over a wide range, it normally will be prepared between about 30° C. and 150° C.

The amount of catalyst used may be varied quite widely and may be as low as 0.01 weight percent based on the weight of the monomer to be polymerized, but normally it will be in the range of about 0.5 to about 5 to 10 weight percent based on the weight of the monomer to be polymerized.

The polymerization of the butene-1 is normally conducted at temperatures below 250° C. and at pressures below 150 atmospheres, and usually is at temperatures between about 25° C. and 150° C. at about 1 to 50 atmospheres. Improved polymerization rates and polymers are obtained with mixtures of butene-1 and other olefins including propene, 3-methyl butene-1 and the like and including copolymers such as butene-1 with ethylene. The novel catalyst system of this invention is particularly advantageous in preparing copolymers of diolefins and α-olefins such as butene-1 and butadiene-1,3. The novel catalyst system may be used in both batch and continuous polymerization processes.

The polymerization reaction may be conducted in bulk but normally will be with an inert diluent. Preferred are inert liquid hydrocarbons and the alkanes such as propane, butane, pentane, heptane and the like are usually employed but such materials as isooctane, cyclohexane, benzene, toluene and the like are also useful.

The polymer formed in accordance with the process of this invention is recovered after stopping the polymerization by deactivating the catalyst as with an alcohol. The polymer is then separated as by filteration, washed and dried.

*Example*

24 millimols of titanium tetrachloride and 4 millimols of stannous chloride were added to 200 ml. of n-heptane in a stirred reaction flask and this mixture heated to about 88° C. to 94° C. 26 millimols of triethyl aluminum in 200 ml. of n-heptane was added to the reactor over a 20 minute period and after all the triethyl aluminum was added the mixture was aged for 20 minutes at 90° C. to 94° C. Butene-1 was added to the reactor gradually (3.0 grams per minute) and intermittently and the reaction was conducted for 4 hours at a reaction temperature from 91° C. to 68° C. The reaction was terminated by adding alcohol to the reaction mixture and the polybutene was separated from the n-heptane dispersion with toluene and methanol and dried. 46 grams of polybutene was obtained. This isotactic polybutene contained 86 percent ether insolubles at a melt index of 1.49, and a density of 0.914. This polybutene also had a torsional modulus of 13,000 p.s.i., a tensile modulus at 0 percent elongation of 33,700 p.s.i. and a yield point of 1,690 p.s.i.

When this example is repeated with 4 millimols of stannic chloride in place of stannous chloride, a yield of only 4 grams of polymer is obtained with greatly inferior physical properties, and when the example is repeated in the absence of any tin chloride additive, low yield of polymer having a melt index of 4.2, a density of 0.89 and which was too soft to have the torsional modulus determined was obtained.

Thus, through the use of a stannous halide, a trialkyl aluminum and titanium tetrachloride, significant increases in rate of polymerization and yield of polymer are obtained even when the molar ratio of trialkyl aluminum to titanium halide is low, which low ratio of these two reactants represents a significant saving in cost and simplifies subsequent processing of the polymer. More important, by means of the novel catalyst of this invention an improved isotactic polymer is obtained as is clearly demonstrated in the examples above. The improved polybutenes obtained as defined find many commercial uses. Polybutene so prepared is readily formed into valuable film materials and pipe.

We claim:

1. A method for polymerizing butene-1 which comprises contacting butene-1 with a catalyst comprising a titanium tetrahalide and a trialkyl aluminum compound wherein the alkyl groups contain 2 to 10 carbon atoms and a stannous halide in a molar ratio of one mol of titanium tetrahalide, about 0.5 to 10 mols of trialkyl aluminum, and about 0.1 to about 0.5 mol of stannous halide.

2. A method for polymerizing butene-1 which comprises contacting butene-1 with a catalyst comprising titanium tetrachloride, a trialkyl aluminum compound wherein the alkyl groups contain 2 to 10 carbon atoms and a stannous halide in a molar ratio of one mol of titanium tetrachloride, about 1 to 4 mols of trialkyl aluminum and about 0.1 to 0.5 mol of stannous halide per mol of titanium tetrachloride.

3. The method of claim 2 wherein the trialkyl aluminum contains alkyl groups containing 2 to 4 carbon atoms.

4. The method of claim 2 wherein the inorganic metal halide is stannous chloride.

5. A catalyst for polymerizing butene-1 which comprises a trialkyl aluminum compound wherein the alkyl groups contain 2 to 10 carbon atoms, titanium tetrachloride and stannous chloride in a molar ratio of about one to 4 mols of trialkyl aluminum and about 0.1 to 0.5 mol of stannous chloride per mol of titanium tetrachloride.

References Cited by the Examiner
UNITED STATES PATENTS

| | | | |
|---|---|---|---|
| 2,887,471 | 5/59 | Shearer et al. | 260—93.7 |
| 2,925,392 | 2/60 | Seelbach et al. | 252—429 |
| 2,953,554 | 9/60 | Miller et al. | 260—94.3 |
| 2,964,510 | 12/60 | Seelbach et al. | 260—93.7 |
| 3,042,626 | 7/62 | Bruce et al. | 252—429 |

FOREIGN PATENTS 825,958    12/59   Great Britain.

JOSEPH L. SCHOFER, *Primary Examiner.*

J. GREENWALD, *Examiner.*